United States Patent [19]

Broden

[11] 4,328,101
[45] May 4, 1982

[54] DEVICE FOR SEPARATING PARTICULATE MATTER FROM A FLUID

[76] Inventor: Carl V. Broden, 5080 Keane Dr., Carmichael, Calif. 95608

[21] Appl. No.: 160,314

[22] Filed: Jun. 17, 1980

[51] Int. Cl.³ .............................................. B01D 21/02
[52] U.S. Cl. .................................. 210/320; 210/532.1; 433/92
[58] Field of Search ................... 433/92; 210/801, 802, 210/320, 521, 522, 532.1, 532.2, DIG. 5, 244

[56] References Cited

U.S. PATENT DOCUMENTS

| | | | |
|---|---|---|---|
| 1,401,182 | 12/1921 | Overton | 210/320 |
| 1,672,583 | 6/1928 | Travers | 210/801 |
| 3,777,403 | 12/1973 | Ritchie | 433/92 |
| 3,904,524 | 9/1975 | Pelton et al. | 210/532.2 |
| 4,058,897 | 11/1977 | Edwards | 433/92 |

*Primary Examiner*—Benoit Castel

*Attorney, Agent, or Firm*—Blair, Brown & Kreten

[57] ABSTRACT

Disclosed herein is a device for separating particulate matter from a fluid which includes an inlet conduit which carries the matter and fluid into a separation chamber defined by a substantially spherical dome having separable upper and lower portions and a flattened bottom surface within which is contained a plurality of baffles suitably oriented within the chamber so that the particulate matter and fluid entering within the chamber is caused to go through a tortuous path, the particulate matter experiencing deceleration due to the increased volume within the chamber relative to the conduit, and a liquid reservoir along the bottom edge portion of the chamber for entraining the matter there within, so that fluid can be allowed to leave the chamber while a discreet level of liquid is maintained and controlled within the chamber itself.

6 Claims, 5 Drawing Figures

U.S. Patent    May 4, 1982    4,328,101
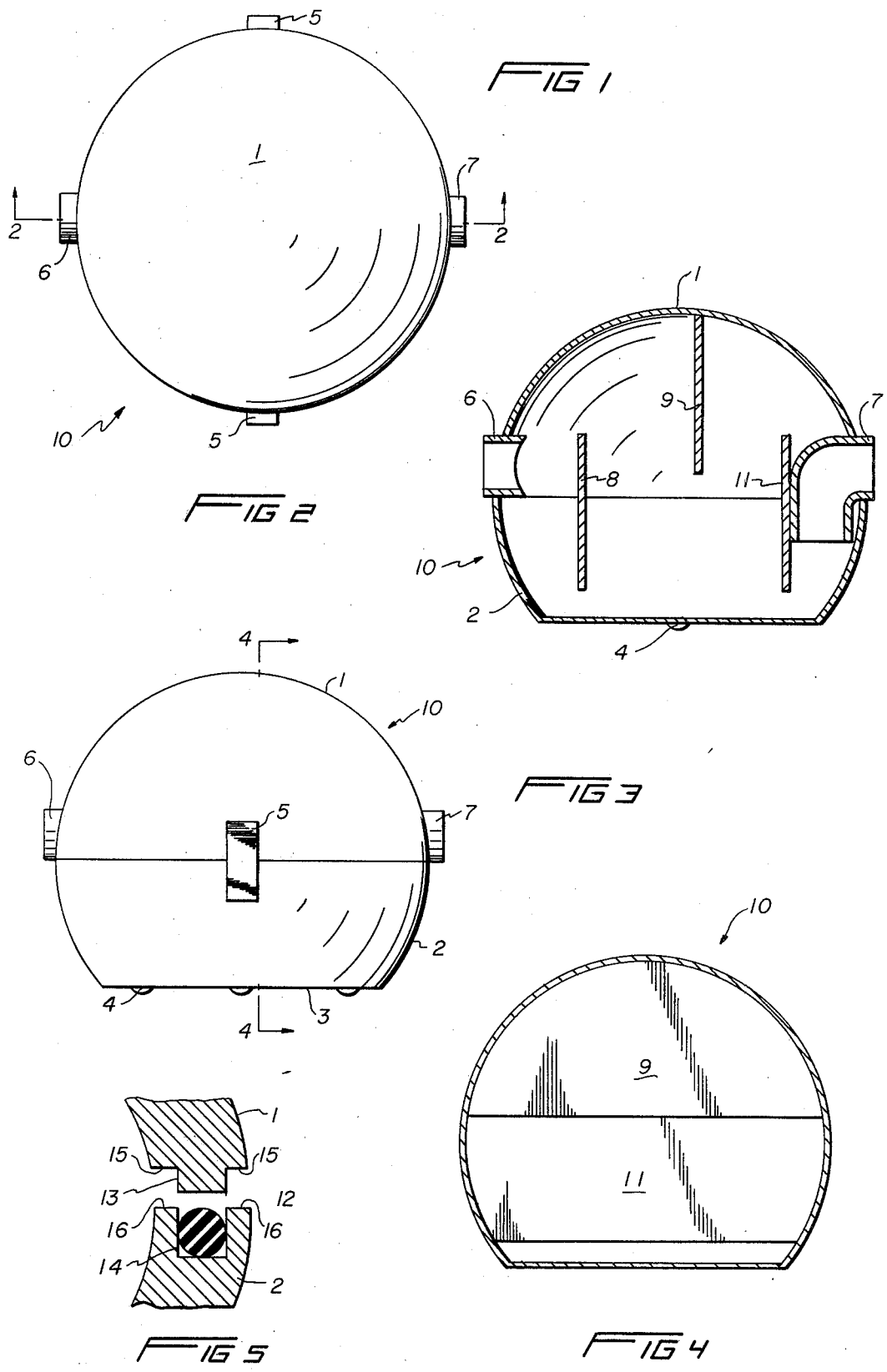

DEVICE FOR SEPARATING PARTICULATE MATTER FROM A FLUID

BACKGROUND OF THE INVENTION

This device is generally directed for collecting dental silver and gold alloy particles. Specifically, the invention relates to a dental silver and gold retrieval device for settling out these metals which have comparatively high specific gravities relative to other matter traditionally contained within a dental slurry or the like.

Heretofore, a collection device had to be placed into each individual operating room of a dentist's office or the particles would be carried down the system into the sewer. Such material as gold and silver is routinely ground or carved from teeth when being worked on by the dentist especially when removing or polishing restorations that involves a high volume evacuation system.

Prior art devices of which applicant is aware includes the following U.S. Pat. Nos.:

1,155,020 Van Orden
3,305,927 Mitchell
3,612,089 Beguiristain
3,777,403 Ritchie
3,847,573 Gandrud While each patent teaches the use of a trap device for use in dentistry, the patent to Ritchie appears to provide a device having the strongest coincidental similarity with that which is defined as the present application, since he uses a barrier 30 to alter the flow path. However, all of these references can be characterized as being precious metal retrieval devices which tend to decrease to vacuum pressure within the system, thereby requiring plural such devices to be utilized when more than one operatory is provided in a dental clinic or the like. Obviously therefore, plural such units are required thereby increasing the costs and also the maintenance time required, since more than one unit has to be emptied.

OBJECTS AND SUMMARY OF THE INVENTION

Accordingly, this invention has as an object to provide a device for collecting dental silver and gold alloy particles commonly provided in dental work in which patient's teeth are routinely ground or carved when removing or polishing restorations with the use of a high volume evacuation system.

A further object of this invention contemplates providing a device of the character described above in which a single unit is to be provided in close proximity to the vacuum source adapted to service plural operatory stations without a discernible decrease in the vacuum pressure associated with the evacuation device.

It is yet a further object of this invention to provide a device of the character described above which is relatively inexpensive when contrasted with the prior art, relatively simple to install, easily maintainable, durable in construction, and easy to use.

It is another object of this invention to provide a device of the character described above in which the fittings associated with the retrieval device are of standard configuration so as to allow the installation thereof to proceed with a minimum degree of hardship and therefore lend itself to a standardized system, affording compatibility.

It is a further object of this invention to provide a device of the character described above whose geometrical configuration is such that it is capable of withstanding internal pressures substantially less than atmospheric.

These and other objects will be made manifest when considering the following detailed specification when taken in conjunction with the appended drawing figures by noting that there has been provided a collection device wherein a chamber having a substantially spherical configuration and a planar bottom face is provided with an inlet conduit and an outlet pipe wherein the internal volume of the chamber is substantially greater than the cross section of the inlet conduit so as to provide a decrease in acceleration of particles entering therein, a liquid reservoir along the bottom surface of the container, a plurality of baffles disposed within the chamber, and an outlet pipe which allows the continuation of the vacuum to go unobstructed while simultaneously controlling the liquid level of the fluid contained in the bottom of the chamber.

BRIEF DESCRIPTION OF THE DRAWINGS

FIG. 1 is a top plan view of the chamber according to the present invention.

FIG. 2 is a sectional view taken along lines 2—2 of FIG. 1.

FIG. 3 is a side view of the chamber as seen in FIG. 1.

FIG. 4 is a sectional view taken along lines 4—4 of FIG. 3.

FIG. 5 is an exploded parts view of the interface between upper and lower portions of the chamber providing details on the seal along the interface thereof.

DESCRIPTION OF THE PREFERRED EMBODIMENT

Referring now to the drawings, wherein like reference numerals refer to like parts throughout the various drawing figures, reference numeral 10 is directed to the device for separating particulate matter from a fluid according to the present invention. This device 10 may generally be regarded as being provided with an inlet conduit 6 disposed in an upper portion 1 of the device, said device having a generally spherical configuration with a planar bottom face 3 supported by feet 4. The lower portion 2 is provided with sealing means for assuring a tight fit between the upper and lower portions so that the vacuum created within the chamber can be maintained. An outlet pipe 7 is provided in the shape of an elbow having a first leg extending outside of the chamber, extending from the upper portion 1, and having a second leg depending downwardly into the second portion 2 so that liquid contained in the lower portion 2 will tend to remain at a level consonant with the bend in the elbow 7. Affixed to the second downwardly extending leg is a third baffle 11; attached to a top portion or ceiling area of the upper portion 1 is a second baffle 9 depending downwardly therefrom and co-extensive with the width of the chamber; and a first baffle 8 extends between sides of the chamber or device 10 as best seen in FIG. 2.

The first baffle 8 has a top most extremity substantially parallel with a top edge of the conduit 6, and the third baffle 11 is parallel with and of substantially the same magnitude as the first baffle. The second baffle extends downwardly from the ceiling of the upper portion 1 and extends slightly below the topmost edge of the first and third baffles terminating substantially along the center of the inlet conduit 6. As shown in FIG. 2, the baffles are all spaced from each other, and oriented in such a manner as shown in FIG. 4 that particulate matter and fluid entering there within must impinge upon the baffles in a manner to be described as follows.

Since the internal volume of the device 10 is significantly larger than the cross sectional area of the inlet conduit 6, a natural deceleration in the heavier particles such as gold and silver occurs naturally. This deceleration is further enhanced by having the particles strike the first baffle 8 causing a large majority of the heavier particles to slide downwardly therefrom and into the liquid level. Lighter particles may tend to ride over the first baffle thereafter engaging the second baffle 9 providing a similar effect wherein these particles are subjected to gravity causing them to fall within the liquid. Still further, the lightest particles must engage the third baffle 11 before any fluid can be allowed to pass within the second leg of the elbow 7 and thereafter into the first horizontal leg thereof. The liquid level is dictated by the elbow shape pipe 7 as explained hereinbefore.

Typically, the vacuum within the chamber is one-half atmospheric pressure, and to assure the vacuum remaining in effect, the upper and lower portions of the chamber are provided with sealing means defined by a channel 14 centrally disposed upon an edge of one portion within which a gasket 12 having the form of an O-ring in a preferred form is set. This central channel is bordered on opposed sides thereof by shoulders 16 which serve as a guide for the other portion of the chamber to mate within the channel 14. Specifically, the downwardly extending rib 13 centrally disposed on the other portion has cutaway portions defining shoulders 15 so that when pressed within the channel 14, a tight sealing arrangement can be effected. To retain the upper and lower portions of the chamber in registry, latches 5 are provided on diametrically opposed faces from each other in a manner well known to the art so as to keep the O-ring or gasket in a constant and steady state of compression.

Having thus described the invention, it should be apparent that numerous structural modifications are contemplated as being a part of this invention as set forth hereinabove and as defined hereinbelow by the claims.

What is claimed is:

1. A device for separating particulate matter from a fluid comprising in combination:
    an inlet conduit carrying said matter and fluid,
    a separation chamber formed from two portions and communicating with said inlet conduit provided with baffle means therein to direct said matter and fluid through a tortuous path, and sealing means between said two portions comprising a channel in an edge of one said portion, a gasket disposed therein, a depending rib in the other said portion for insertion into said channel, and at least one latch for affixing said two portions and depressing said gasket, said baffle means includes a first baffle extending from a top edge of said inlet conduit into said fluid in said reservoir and laterally spaced from said inlet, a second baffle extending from a ceiling of said separation chamber to an area below said top edge of said inlet conduit, and spaced from said first baffle, and a third baffle affixed to an outlet means which controls the egress of the fluid, said third baffle being parallel to and co-extensive with said first baffle.

2. The device of claim 1 wherein said outlet means controls the depth of said fluid in said reservoir.

3. The device of claim 2 wherein said outlet means comprises an elbow shaped pipe having a first leg extending outside of said chamber and a second leg extending into said fluid contained in said fluid reservoir thereby controlling the fluid level.

4. The device of claim 3 wherein said separation chamber has an internal volume greater than a cross section of said inlet conduit whereby the particulate matter entering therein decelerates while maintaining an associated vacuum in said inlet.

5. The device of claim 4 wherein said conduit and pipe are disposed in said upper portion.

6. The device of claim 5 wherein said chamber has a substantially spherical contour with a planar bottom face so as to efficiently withstand the vacuum.

* * * * *